(12) United States Patent
Nakayama

(10) Patent No.: US 8,797,289 B2
(45) Date of Patent: Aug. 5, 2014

(54) ELECTRONIC DEVICE

(75) Inventor: Shusuke Nakayama, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 161 days.

(21) Appl. No.: 13/579,015

(22) PCT Filed: Jan. 26, 2011

(86) PCT No.: PCT/JP2011/051403
§ 371 (c)(1),
(2), (4) Date: Aug. 14, 2012

(87) PCT Pub. No.: WO2011/099361
PCT Pub. Date: Aug. 18, 2011

(65) Prior Publication Data
US 2012/0306799 A1    Dec. 6, 2012

(30) Foreign Application Priority Data

Feb. 15, 2010    (JP) ................................. 2010-029833

(51) Int. Cl.
*G06F 3/041*    (2006.01)
(52) U.S. Cl.
USPC .......................................... 345/173; 345/174
(58) Field of Classification Search
None
See application file for complete search history.

(56) References Cited

U.S. PATENT DOCUMENTS

| | | | |
|---|---|---|---|
| 7,982,721 B2* | 7/2011 | Hio | 345/173 |
| 2006/0170660 A1 | 8/2006 | Miyata et al. | |
| 2009/0207147 A1* | 8/2009 | Perrot et al. | 345/173 |
| 2011/0084910 A1* | 4/2011 | Almalki et al. | 345/173 |
| 2011/0248929 A1* | 10/2011 | Tong et al. | 345/173 |

FOREIGN PATENT DOCUMENTS

| | | |
|---|---|---|
| JP | 2005-018669 A | 1/2005 |
| JP | 2006-013661 A | 1/2006 |
| JP | 2006-039745 A | 2/2006 |
| JP | 2006-134609 A | 5/2006 |
| JP | 2006-209684 A | 8/2006 |

OTHER PUBLICATIONS

International Search Report; PCT/JP2011/051403; Mar. 22, 2011.

* cited by examiner

*Primary Examiner* — Joseph Haley
(74) *Attorney, Agent, or Firm* — Studebaker & Brackett PC

(57) ABSTRACT

An electronic device, which accepts inputs in a plurality of levels according to pressing loads, after a first-level input is accepted, when a load detecting unit continuously detects a pressing load, which satisfies a first load standard for releasing the acceptance of the first-level input and does not satisfy a second load standard for accepting a second-level input higher than the first load standard, for a predetermined time period, the control unit controls at least one load standard of the first load standard and the second load standard so that an interval from the first load standard to the second load standard widens.

4 Claims, 10 Drawing Sheets

(FIG. 2 CONTINUED)
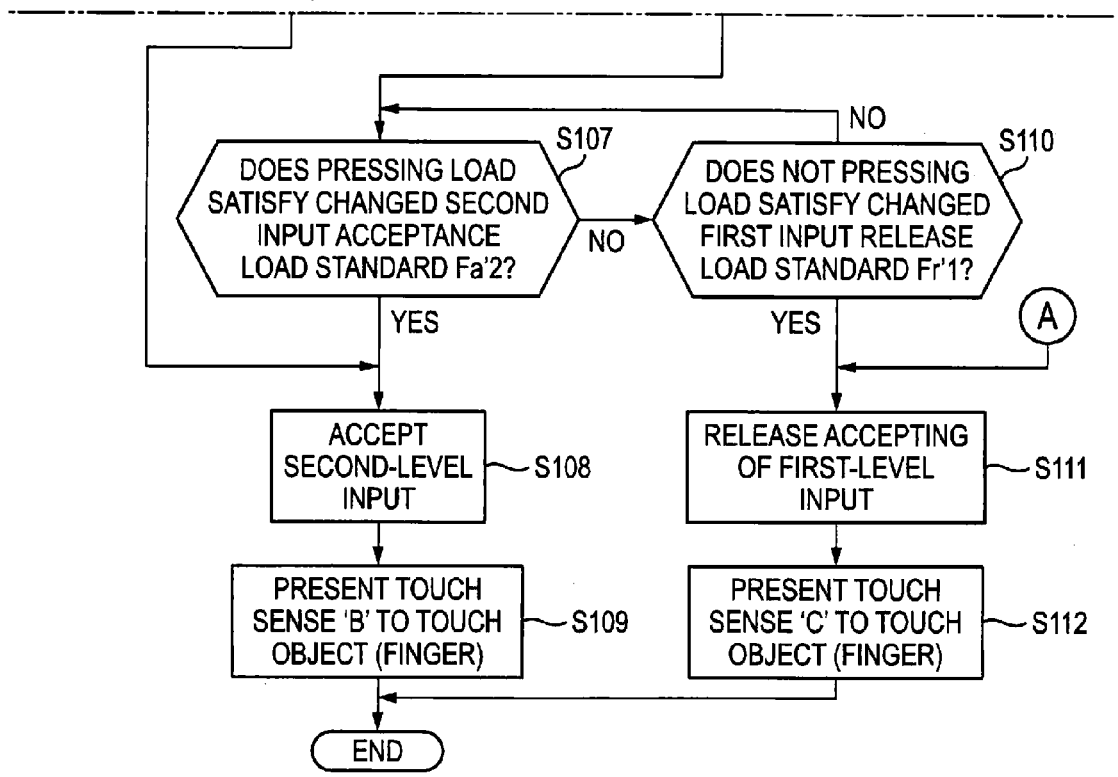

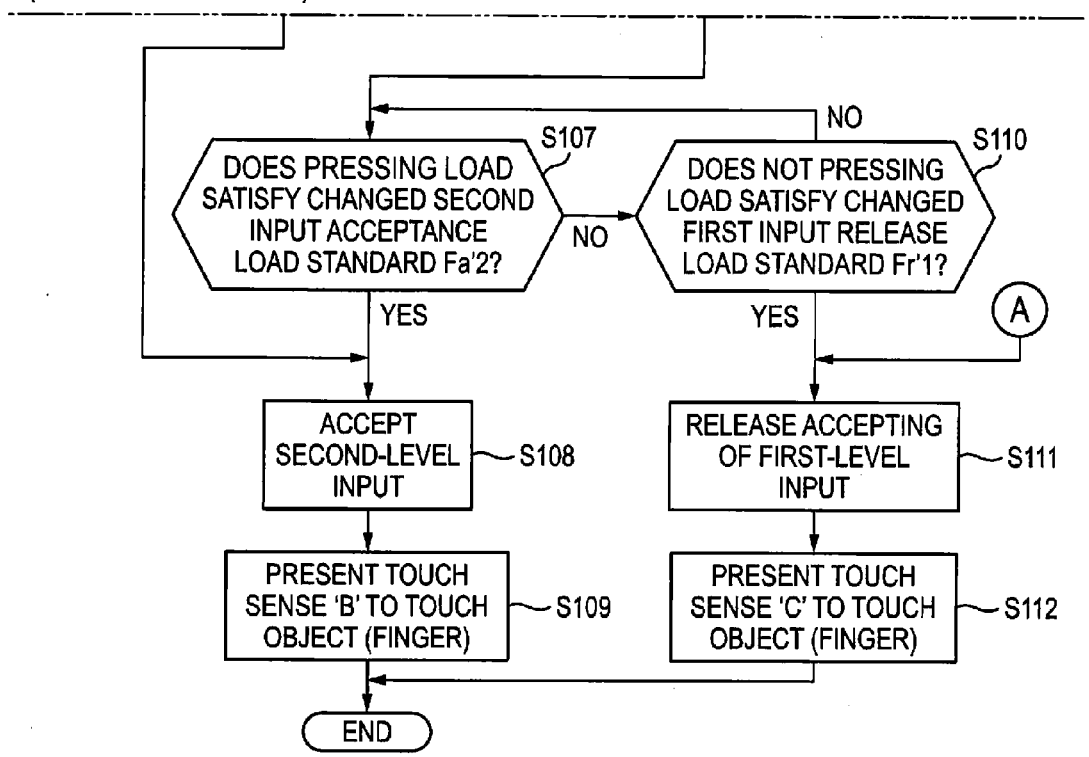

ELECTRONIC DEVICE

TECHNICAL FIELD

The present invention relates to an electronic device, and specifically, to an electronic device that accepts inputs in a plurality of levels based on pressing loads.

BACKGROUND ART

Previously, electronic devices such as portable phones and digital cameras use mechanical switches, such as tactile switches and membrane switches, as an input unit enabling users to perform manipulation input. Specifically, recently, there are many small terminal devices having a variety of functions, and these terminal devices includes keys, buttons, and the like made of various kinds of switches on their faces.

As for these switches, in general, one operation (or program) is assigned to one switch. For example, in a case of a portable phone, when a pressing input to a numeral keypad is detected, a number corresponding to each key is output. Alternatively, when a pressing input to a numeral keypad is detected, a menu screen is displayed.

However, for example, in a case where it is desired to sequentially perform a plurality of operations, when each operation is performed using a separate switch to which the corresponding operation has been assigned, a lot of trouble may be required. For this reason, it is possible to consider a configuration in which one switch is used to perform operations in order whenever an input to the switch is detected. However, in this input type, the order in which the operations are performed is to be defined in advance. Therefore, it is impossible for a user to perform manipulation for immediately performing a desired arbitrary operation.

In order to solve the above-mentioned problem, there has been proposed an input device capable of assigning a plurality of operations based on input types to one switch (see, for example, Patent Document 1).

The input device disclosed in Patent Document 1 can receive inputs in two levels according to pressing loads regarding inputs when manipulation is performed.

FIG. 8 is a cross-sectional view schematically illustrating an internal configuration of a manipulation device 100 disclosed in Patent Document 1. As shown in FIG. 8, the manipulation device 100 includes a first detecting unit 200, a second detecting mean 300, and membrane switches, and the second detecting mean 300 is provided below the first detecting unit 200 (in a pressing direction). A portion to be directly touched by a finger F of a user is made of a flexible member, and when the user presses the manipulation device 100, the flexible member bends so as to transfer the pressing load to the first detecting unit 200. When the user presses a position corresponding to a first contact point S3 with the finger F with a low weight (a first manipulation force), a first upper conductive portion 201c and a first lower conductive portion 202c come into contact with each other, so that the first contact point S3 becomes conductive. This is considered as a first-level input. Also, when the user presses the corresponding position with the finger F with a high weight (a second manipulation force) larger than the low weight, a second upper conductive portion 301c and a second lower conductive portion 302c come into contact with each other, so that a second contact point T3 becomes conductive. This is considered as a second-level input. Furthermore, FIG. 8 shows a situation in which the manipulation device 100 was pressed by the second manipulation force of the finger F of the user, and thus the first contact point S3 detects not only the first-level input and the second contact point T3 also detects the second-level input.

This input device receives user's inputs in two levels based on the pressing loads of the inputs, and thus it is possible to assign different operations to those individual levels. In a case of using this input device, the user can use one switch (input device) to differentially perform a plurality of inputs by adjusting a pressing force when performing one operation of performing a pressing input to the switch.

In other words, according to this input device which receives two-level inputs, the user can perform a first-level input by keeping a state in which a button is pressed by a weak pressing force. This input state is called 'a half-press', and is hereinafter referred to as 'a first-level input'. Further, according to this input device, the user can perform a second-level input by pressing the button with a pressing force stronger than that of the first-level input. This input state is called 'a full-press', and is hereinafter referred to as 'a second-level input'.

As an example of the typical purposes of that input device which accepts inputs in two levels based on pressing loads by a mechanical switch, there is a shutter button of a camera. In general, in a portable terminal or the like having a digital camera function and the like, a user performs a 'half-press' input as a first-level input, thereby enabling an auto exposure (AE) or auto focus (AF) function. In this state, the user performs a 'full-press' input as a second-level input, thereby performing an operation of clicking the shutter. In this way, it is possible to assign different operations by the first-level input and the second-level input, and the user can distinguish the different operations and perform manipulation according to a desired operation.

Also, the input device which receives multi-level inputs based on pressing loads is not limited to the mechanical switch. For example, as for a touch panel type input device configured by combining a display device and a position input device, there has been suggested an input device which receives multi-level inputs based on pressing loads by performing a process according to software (see, for example, Patent Document 2).

A touch panel type input device disclosed in Patent Document 2 includes a position detecting unit detecting a pressed position of a touch panel provided to a face portion of a display screen, and a pressure detecting unit detecting a pressing force on the touch panel. In this input device, it is possible to perform inputs of two systems, i.e. an input based on a detection position of the position detecting unit, and multi-level inputs based on the detection of the pressure detecting unit, by one time pressing manipulation on the touch panel.

According to this input device, when a user presses the touch panel on the display screen, it is possible to perform an input of a first system based on the pressed position, and at the same time, it is possible to perform an input of a second system based on the pressing force on the touch panel at that time. Then, based on the pressing force on the touch panel, selection of multiple levels, that is, three or more levels becomes possible. Therefore, the user can perform inputs of two systems by performing pressing manipulation on the touch panel once, and thus it is possible to reduce the number of times pressing manipulation.

As described above, even in an input device using a mechanical switch, and even in an input device using a touch panel, it is possible to receive inputs in a plurality of levels based on pressing loads. In this input device, since inputs are distinctively accepted in a plurality of levels based on pressing loads, it is possible to group a plurality of functions for one button or key. Therefore, it is possible to reduce the number of keys and buttons regarding manipulation inputs. Specifically, in a case of small terminals like portable terminals, since a case of each individual terminal is small, it is difficult to provide a lot of keys and buttons to the main body of the terminal. Therefore, in a portable terminal, when it is possible to properly use a plurality of functions by using a few keys and buttons, it is possible to reduce keys and buttons which is to be provided to the main body of the terminal.

CITATION LIST

Patent Literature

Patent Document 1: Japanese Patent Application Laid-Open No. 2006-134609
Patent Document 2: Japanese Patent Application Laid-Open No. 2006-039745

SUMMARY OF INVENTION

However, in the manipulation device 100 disclosed in Patent Document 1, the specification of each of the disposition, configuration, and the like of each of the mechanical switches of the first detecting unit 200 and the mechanical switches of the second detecting mean 300 is defined in advance at the time of design or manufacture. Further, the degree of flexibility of each of the members configuring the mechanical switches is also determined at the time of product manufacture. Therefore, it is difficult to change the specification of this configuration, later.

For this reason, in this input device, a user has no choice but to actually perform input manipulation and sensuously grasp what degree of pressing load the first-level input is accepted by, and what degree of pressing load the second-level input is accepted by, by trial and error. In other words, each user needs to match user's own pressing force to the defined pressing loads required by the input device.

In general, in delicate work and a fine adjustment of increasing or decreasing the force of a fingertip, there are significant differences between users according to their strong and weak points. Therefore, light-handed persons may naturally perform some kinds of input manipulation without special difficulties. However, all users may always immediately cope with those kinds of input manipulation.

For this reason, even when a user wants to stop at the first-level input for the input device, the user may fail to appropriately perform fine adjustment of increasing or decreasing the force and the pressing force may be too increased, so that the second-level input is unintentionally performed. Further, after the first-level input is accepted, even when the user wants to keep the acceptance of the first-level input, the user may fail to appropriately performing fine adjustment of increasing or decreasing the force so that the pressing force decreases, whereby the acceptance of the first-level input is unintentionally released. Specifically, since the user cannot visibly recognize the degree of load when performing input manipulation by pressing, it is difficult for the user to accurately grasp how much pressing force is to be adjusted for making an input of each level being accepted and releasing accepting of an input.

These circumferences are caused even in the case of the above-mentioned Patent Document 2. Unless thresholds for pressing loads to be accepted by a pressure detecting unit are set in advance, the touch panel type input device disclosed in Patent Document 2 can not receive inputs in a plurality of levels based on pressing loads. Therefore, each user has to adjust user's own pressing force to the defined pressing loads required by the input device. For this reason, even when a user wants to stop at the first-level input, the user may fail to appropriately performing fine adjustment of increasing or decreasing the force so that the pressing force too increases-or-decreases, whereby the second-level input is unintentionally performed or the first-level input is unintentionally released.

Further, the touch panel type input device disclosed in the above-mentioned Patent Document 2 does not use any mechanical switch, but a control unit can perform control by software, based on the pressing load accepted by the pressure detecting unit. Therefore, it can be considered that it is possible to change the thresholds for pressing loads to be accepted by the pressure detecting unit by changing the options of the control unit later.

However, it is very cumbersome work that the thresholds for pressing loads to be accepted by the pressure detecting unit is changed in accordance with each user, whenever a user change is performed. Further, even in cases whether a single user performs manipulation, the pressing load when the user performs manipulation generally varies deepening cases when the user performs the manipulation. Therefore, it is impossible to solve the problem in which, when the user wants to stop at the first-level input, the user may too increase-or-decrease the pressing force, thereby unintentionally performing the second-level input or unintentionally releasing the first-level input.

As described above, when an input unintended by the user is performed, the input device performs an operation according to a reasonable procedure, but this operation is a mere malfunction for the user. For example, in a case of applying the above-mentioned input device to a shutter button of a camera, when the pressing force of the user is not appropriately performed so that the second-level input is accepted beyond the first-level input at once, a shutter is clicked before the AE and/or AF function appropriately operates. In this case, since the AE and/or AF function does not approximately operate, an out-of-focus image may be acquired. Further, when the first-level input is being accepted, when the user's pressing force is unintentionally reduced, the acceptance of the first-level input is released, and the AE and/or AF function stops during exposure or focus adjustment according to the AE and/or AF function. As described above, although the AE and/or AF function stopped during adjustment of exposure or focus, the user may erroneously determine that the exposure or focus adjustment according to the AE and/or AF function was completed and then perform an operation of shooting the shutter in a state in which appropriate exposure or focusing has not been set.

Therefore, an object of the present invention made in view of those circumferences is to provide an electronic device, which accepts inputs based on pressing loads, and reduces a risk that input acceptance or release unintended by a user will be performed.

In order to solve the above-problem, an electronic device according to a first aspect of the present invention, which accepts inputs in a plurality of levels according to pressing loads, comprise: a load detecting unit, which detects a pressing load of an input according to pressing; and a control unit, which controls so that, when the load detecting unit detects a pressing load that satisfies a load standard for accepting an input, the input is accepted, and which controls so that, when the load detecting unit detects a pressing load that does not satisfy a load standard for releasing the acceptance of the input after the input is accepted, the accepting state of the input is released, wherein, after a first-level input is accepted, when the load detecting unit continuously detects a pressing load, which satisfies a first load standard for releasing the acceptance of the first-level input and does not satisfy a second load standard for accepting a second-level input higher than the first load standard, for a predetermined time period, the control unit controls at least one load standard of the first load standard and the second load standard so that an interval from the first load standard to the second load standard widens.

Further, an electronic device according to a second aspect of the present invention, which accepts inputs in a plurality of levels according to pressing loads, comprises: a load detecting unit that detects a pressing load of an input according to pressing; and a control unit, which controls so that, when the load detecting unit detects a pressing load that satisfies a load standard for accepting an input, the input is accepted, and which controls so that, when the load detecting unit detects a pressing load that does not satisfy a load standard for releasing the acceptance of the input after the input is accepted, the accepting state of the input is released, wherein, after a first-level input is accepted, when the load detecting unit continuously detects a pressing load, which satisfies a first load standard for releasing the acceptance of the first-level input and does not satisfy a second load standard for accepting a second-level input higher than the first load standard, for a predetermined time period, the control unit controls at least one load standard of the first load standard and the second load standard so that an interval from the corresponding load standard to the pressing load detected by the load detecting unit widens.

Further, an electronic device according to a third aspect of the present invention, which accepts inputs in a plurality of levels according to pressing loads, comprises: a touch sensor, which detects touch; a load detecting unit, which detects a pressing load on a touch face of the touch sensor; and a control unit, which controls so that, when the load detecting unit detects a pressing load that satisfies a load standard for accepting an input, the input is accepted, and which controls so that, when the load detecting unit detects a pressing load that does not satisfy a load standard for releasing the acceptance of the input after the input is accepted, the accepting state of the input is released, wherein, after a first-level input is accepted, when the load detecting unit detects a pressing load, which satisfies a first load standard for releasing the acceptance of the first-level input and does not satisfy a second load standard for accepting a second-level input higher than the first load standard, if a slide of a touch object being in touch with the touch face is detected, the control unit controls at least one load standard of the first load standard and the second load standard so that an interval from the first load standard to the second load standard widens.

Further, an electronic device according to a fourth aspect of the present invention, which accepts inputs in a plurality of levels according to pressing loads, comprise: a touch sensor, which detects touch; a load detecting unit, which detects a pressing load on a touch face of the touch sensor; and a control unit, which controls so that, when the load detecting unit detects a pressing load that satisfies a load standard for accepting an input, the input is accepted, and which controls so that, when the load detecting unit detects a pressing load that does not satisfy a load standard for releasing the acceptance of the input after the input is accepted, the accepting state of the input is released, wherein, after a first-level input is accepted, when the load detecting unit detects a pressing load, which satisfies a first load standard for releasing the acceptance of the first-level input and does not satisfy a second load standard for accepting a second-level input higher than the first load standard, if a slide of a touch object being in touch with the touch face is detected, the control unit controls at least one load standard of the first load standard and the second load standard so that an interval from the corresponding load standard to the pressing load detected by the load detecting unit widens.

According to the above-mentioned electronic devices, after the first-level input is accepted, at least one load standard of the first load standard for releasing the acceptance of the first-level input and the second load standard for accepting the second-level input is controlled. Therefore, it is possible to reduce a risk that input acceptance or releasing unintended by the user will be performed.

REFERENCE SIGNS LIST

11 TOUCH SENSOR
11a TOUCH FACE
12 LOAD DETECTING UNIT
13 TOUCH-SENSE PRESENTING UNIT
14 DISPLAY UNIT
15 STORAGE UNIT
16 CONTROL UNIT

DESCRIPTION OF EMBODIMENTS

Hereinafter, embodiments of an electronic device according to the present invention will be described with reference to the drawings.

First Embodiment

Figure 1:
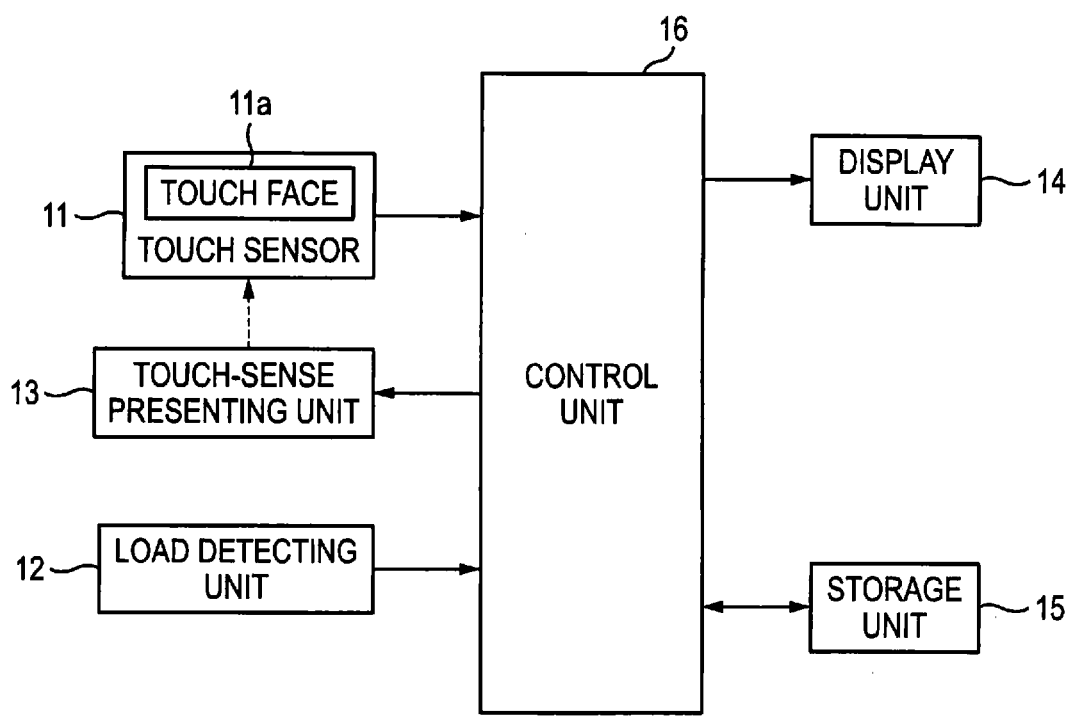
FIG. 1 is a functional block diagram illustrating an electronic device according to an embodiment of the present invention.

FIG. 1 is a functional block diagram illustrating an electronic device according to an embodiment of the present invention. As shown in FIG. 1, the electronic device includes a touch sensor 11, a load detecting unit 12, a touch-sense presenting unit 13, a display unit 14, a storage unit 15, and a control unit 16 for controlling an entire operation.

The touch sensor 11 detects touch of a touch object such as a finger or a stylus on a touch face 11, and is configured by such as a resistive manner, a capacitive manner, an optical manner, or the like, and is disposed on the display unit 14. The load detecting unit 12 detects a pressing load of an input according to pressing and detects, for example, a pressing load on the touch face 11a of the touch sensor 11. The load detecting unit 12 is configured by elements such as strain gauge sensors or piezoelectric elements which react against loads. The touch-sense presenting unit 13 vibrates the touch sensor 11 and is configured by, for example, piezoelectric elements.

The display unit 14 displays objects for input such as input buttons like push-button switches and is configured by, for example, a liquid crystal display, an organic EL display panel, or the like. The touch of the touch object on an input object displayed on the display unit 14 is detected by the control unit 13, based on the position information output from the touch sensor 11.

The storage unit 15 stores various applications, various kinds of input information, and the like, and also serves as a working memory or the like. Specifically, in the present embodiment, the storage unit 15 stores a load standard for accepting an input of each level, and a load standard for releasing accepting of an input, and temporarily stores a pressing load on the touch face 11a detected by the load detecting unit 12, and the like to be processed in the control unit 16.

The control unit 16 is made of, for example, a CPU, and controls the operation of each unit on the basis of the position information from the touch sensor 11 and pressing load information from the load detecting unit 12.

Figure 2:
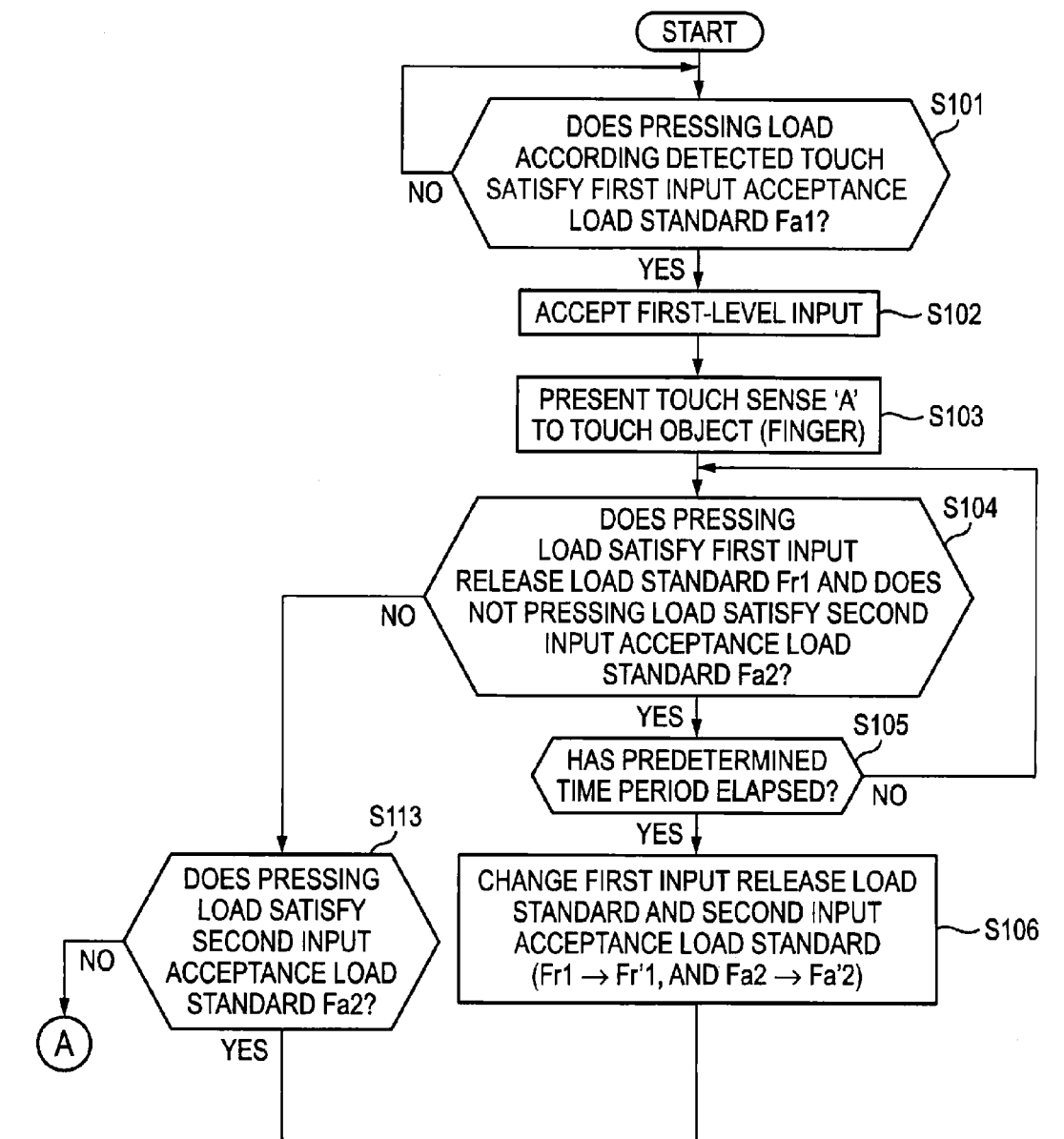
FIG. 2 is a flow chart illustrating an input process of an electronic device according to a first embodiment of the present invention.

Next, an input process of the electronic device according to the present embodiment will be described. FIG. 2 is a flow chart illustrating the flow of the input process of the electronic device according to the present embodiment.

First, the control unit 16 detects touch of the touch object such as a finger on the touch face 11a of the touch sensor 11, and determines whether a pressing load according to the touch of the touch object such as the finger detected by the load detecting unit 12 satisfies a first load standard (referred to as 'a first input acceptance load standard') Fa1 for accepting a first-level input (step S101). In a case where the pressing load detected by the load detecting unit 12 satisfies the first input acceptance load standard Fa1, the control unit 16 receives the first-level input and then performs a process to perform an operation corresponding to the first-level input defined in the electronic device (step S102). For example, in a case where the electronic device is being performing image acquisition by an image acquiring function, the process of step S102 starts an operation corresponding to a case where a shutter button is half-pressed, i.e. an AE and/or AF process according to an AE and/or AF function.

Next, the control unit 16 controls the touch-sense presenting unit 13 so that the touch-sense presenting unit 13 presents a touch sense 'A' to the finger being in touch with the touch face 11a, for notifying a user of that the first-level input has been accepted (step S103). After step S103, the control unit 16 determines whether the pressing load according to the touch of the touch object detected by the load detecting unit 12 satisfies a first load standard (referred to as 'a first input release load standard') Fr1 for releasing the acceptance of the first-level input and then does not satisfy a second load standard (referred to as 'a second input acceptance load standard') Fa2 for accepting a second-level input which is higher than the first input release load standard (step S104). Here, in case that it is determined that the pressing load according to the touch of the touch object detected by the load detecting unit 12 satisfies the first input release load standard Fr1 and does not satisfy the second input acceptance load standard Fa2, the control unit 16 proceeds to step S105, and in case that it is not determined that way the control unit 16 proceeds to step S113.

In step S105, the control unit 16 determines whether the load detecting unit 12 has continuously detected the pressing load, which satisfies the first input release load standard Fr1 and does not satisfy the second input acceptance load standard Fa2, for a predetermined time period (step S105). In case that it is determined in step S105 that the load detecting unit 12 has continuously detected the pressing load, which satisfies the first input release load standard Fr1 and does not satisfy the second input acceptance load standard Fa2, for the predetermined time period, the control unit 16 proceeds to step S106, and in case that it is determined that it is not continuously detected for the predetermined time period, the control unit 16 returns to step S104.

In step S106, the control unit 16 controls each of the first input release load standard Fr1 and the second input acceptance load standard Fa2 so that an interval from the first input release load standard Fr1 to the second input acceptance load standard Fa2 widens. In other words, the control unit 16 newly sets a load standard lower than the first input release load standard Fr1 as a first input release load standard (referred to as 'a changed first input release load standard') Fr'1, and also newly sets a load standard higher than the second input acceptance load standard as a second input acceptance load standard (referred to as 'a changed second input acceptance load standard') Fa'2.

After step S106, the control unit 16 determines whether the pressing load according to the touch of the touch object detected by the load detecting unit 12 satisfies the changed second input acceptance load standard Fa'2 (step S107). In a case where the pressing load according to the touch of the touch object detected by the load detecting unit 12 satisfies the changed second input acceptance load standard Fa'2, the control unit 16 receives the second-level input, and then performs a process to perform an operation corresponding to the second-level input defined in the electronic device (step S108). For example, in a case where the electronic device is being performing image acquisition according to an image acquiring function, the process of step S108 performs an operation in a case where a shutter button is full-pressed, i.e. an operation of clicking the shutter. Next, the control unit 16 controls the touch-sense presenting unit 13 so that the touch-sense presenting unit 13 presents a touch sense 'B' to the touch object, such as a finger, being in touch with the touch face 11a, for notifying the user of that the second-level input has been accepted (step S109), and terminates the present process. Further, the touch sense 'B' presented to the touch object may be the same as or different from the touch sense 'A' in step S103.

Meanwhile, in case that it is determined in step S107 that the pressing load according to the touch of the touch object detected by the load detecting unit 12 does not satisfy the changed second input acceptance load standard Fa'2, the control unit 16 subsequently determines whether the pressing load satisfies the changed first input release load standard Fr'1 (step S110). In case that it is determined in step S110 that the pressing load according to the touch of the touch object detected by the load detecting unit 12 does not satisfy the changed first input release load standard Fr'1, the control unit 16 releases the acceptance of the first-level input (step S111). For example, in a case where the control unit 16 has accepted the first input in step S102 to start the AE and/or AF process according to the AE and/or AF function, the control unit 16 releases the acceptance of the first input, thereby stopping the AE and/or AF process. After step S111, the control unit 16 controls the touch-sense presenting unit 13 so that the touch-sense presenting unit 13 presents a touch sense 'C' to the touch object, such as a finger, being in touch with the touch face 11a, for notifying the user of that the acceptance of the first-level input has been released (step S112), and terminates the present process. Further, the touch sense 'C' presented to the touch object may be the same as or different from the touch sense 'A' or touch sense 'B' in step S103 or step S109. Meanwhile, in case that it is determined in step S110 that the pressing load according to the touch of the touch object detected by the load detecting unit 12 satisfies the changed first input release load standard Fr'1, the control unit 16 returns to step S107.

In case that it is determined in step S104 that the load detecting unit 12 is not detecting the pressing load that satisfies the first input release load standard Fr1 and does not satisfy the second input acceptance load standard Fa2, the control unit 16 proceeds to step S113. The control unit 16 determines whether the pressing load according to the touch of the touch object detected by the load detecting unit 12 satisfies the second input acceptance load standard Fa2. In case that it is determined that the pressing load satisfies the second input acceptance load standard Fa2, the control unit 16 proceeds to step S108, and in case that it is determined that it is not satisfied, the control unit 16 proceeds to step S111.

Figure 3:
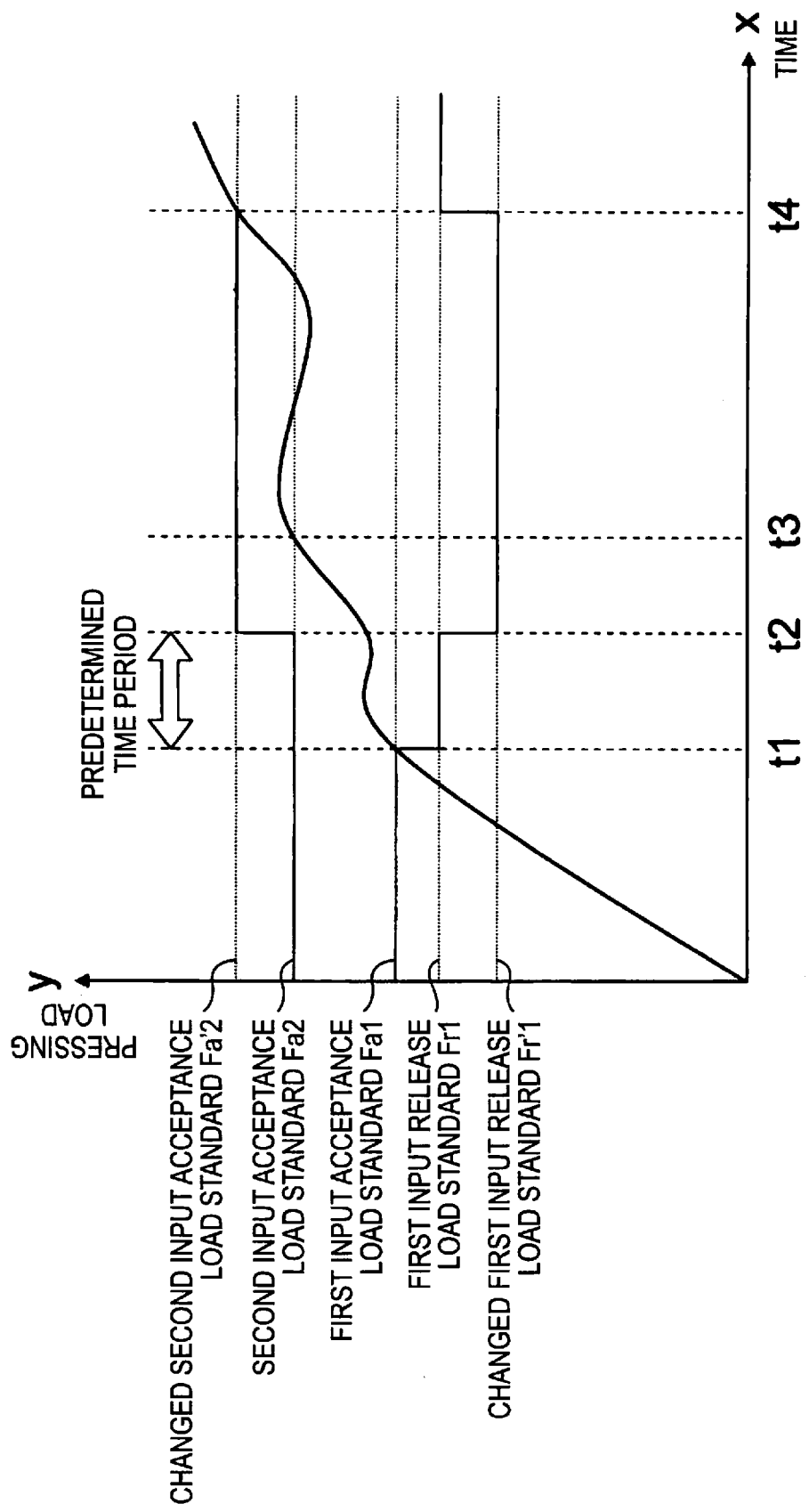
FIG. 3 is a graph illustrating about changing of a pressing load detected by a load detecting unit of the electronic device according to the first embodiment of the present invention.

FIG. 3 is a graph illustrating about changing of the pressing load detected by the load detecting unit 12. An X-axis direction represents the passage of time, and a Y-axis direction represents the pressing load detected by the load detecting unit 12. In FIG. 3, the time point at which the user touches the touch face 11a of the touch sensor 11 is the original point, and the pressing load at that time is 0.

After touching the touch face 11a, when the user applies a pressing force to the touch face 11a, the pressing load detected by the load detecting unit 12 increases with time. At a time point t1, the pressing load detected by the load detecting unit 12 reaches (satisfies) the first input acceptance load standard Fa1, so that the first-level input is accepted, whereby the AE and/or AF process starts. At this time, the control unit 16 controls the touch-sense presenting unit 13 so that the touch-sense presenting unit 13 presents the touch sense to the touch object being in touch with the touch face 11a. Therefore, the user can see that the first-level input has been accepted.

The user receives the touch sense at the time point t1 and recognize that the AE and/or AF process has started, and then the user maintains the pressing force on the touch face 11a constant until the AE and/or AF process is completed. Here, when the load detecting unit 12 continuously detects the pressing load, which satisfies the first input release load standard Fr1 and does not satisfy the second input acceptance load standard Fa2, for the predetermined time period, at a time point t2, the control unit 16 newly sets a load standard lower than the first input release load standard Fr1, as the first input release load standard (changed first input release load standard) Fr'1, and also newly sets a load standard higher than the second input acceptance load standard, as the second input acceptance load standard (changed second input acceptance load standard) Fa'2. As described above, in a case where the pressing load detected by the load detecting unit 12 is maintained for the predetermined time period in a state in which it satisfies the first input release load standard Fr1 and does not satisfy the second input acceptance load standard Fa2, the control unit 16 determines that the user is controlling the pressing force for continuously maintaining the acceptance of the first-level input, and changes each of the first input release load standard Fr1 and the second input acceptance load standard Fa2 so as to suppress the acceptance of the first-level input from being released due to a change in the pressing force unintended by the user or to suppress the second-level input from being newly accepted due to a change in the pressing force unintended by the user. According to the changing of the load standards changes, even when a pressing load reaching (satisfying) the unchanged second input acceptance load standard Fa2 is detected at a time point t3 by the load detecting unit 12, a new input is not accepted as the second-level input.

After the AE and/or AF process is completed, the user can consciously increase the pressing force so that the load detecting unit 12 detects a pressing load satisfying the changed second input acceptance load standard Fa'2 (at a time point t4), so that the shutter is clicked.

As described above, according to the present embodiment, when the load detecting unit 12 detects the pressing load which satisfy the first input release load standard Fr1 and does not satisfy the second input acceptance load standard Fa2 for the predetermined time period, the control unit 16 newly sets a load standard lower than the first input release load standard Fr1, as the first input release load standard Fr'1, and also newly sets a load standard higher than the second input acceptance load standard Fa2, as the second input acceptance load standard Fa'2. Therefore, it is possible to reduce a risk that, when it is desired to maintain the acceptance of the first-level input, the acceptance of the first-level input is unintentionally released or the second-level input is newly accepted, due to a change in the pressing force unintended by the user.

Further, in the present embodiment, in step S106, both of the first input release load standard Fr1 and the second input acceptance load standard Fa2 are changed so that the first input release load standard Fr'1 and the second input acceptance load standard Fa'2 are set as new load standards. However, the present invention is not limited thereto. Only one load standard of the first input release load standard Fr1 and the second input acceptance load standard Fa2 may be changed, so that either the changed first input release load standard Fr'1 and the second input acceptance load standard Fa2 or the first input release load standard Fr1 and the changed second input acceptance load standard Fa'2 are set as the new load standards. At this time, the control unit 16 may control so that an interval from the changed first input release load standard Fr'1 to the second input acceptance load standard Fa2 or an interval from the first input release load standard Fr1 to the changed second input acceptance load standard Fa'2 is wider than the interval from the first input release load standard Fr1 to the second input acceptance load standard Fa2.

Second Embodiment

Next, an electronic device according to a second embodiment of the present invention will be described. The second embodiment of the present invention is changed in the method of setting the new load standards in step S106 described in the above-mentioned first embodiment with reference to FIG. 2. The electronic device according to the second embodiment can be implemented by the same configuration as that of the electronic device described in the first embodiment, and is different from the electronic device according to the first embodiment in the process and operation of the control unit 16. Therefore, the same explanation as that in the above-mentioned first embodiment, and a description of the same effects as those of the first embodiment will be appropriately omitted.

Similarly to the first embodiment, with respect to the second embodiment, an input process will be described with reference to the flow chart of FIG. 2. In the second embodiment, in case that it is determined in step S105 that the load detecting unit 12 has continuously detected the pressing load, which satisfies the first input release load standard Fr1 and does not satisfy the second input acceptance load standard Fa2, for the predetermined time period, the control unit 16 performs the following process, instead of the process of step S106. This process is referred to a process of step S206. In step S206, the control unit 16 newly sets the load standards on the basis of the pressing load detected in step S105 by the load detecting unit 12 at the time point at which the predetermined time period had elapsed. When the pressing load detected in step S105 by the load detecting unit 12 at the time point at which the predetermined time period had elapsed is 'A' and the interval from the first input release load standard Fr'1 to the second input acceptance load standard Fa'2 is 13'. In step S206, the changed first input release load standard Fr'1 is set to a load standard expressed by Fr'1=A−B/2, and the changed second input acceptance load standard Fa'2 is set to a load standard expressed by Fa'2=A+B/2.

Figure 4:
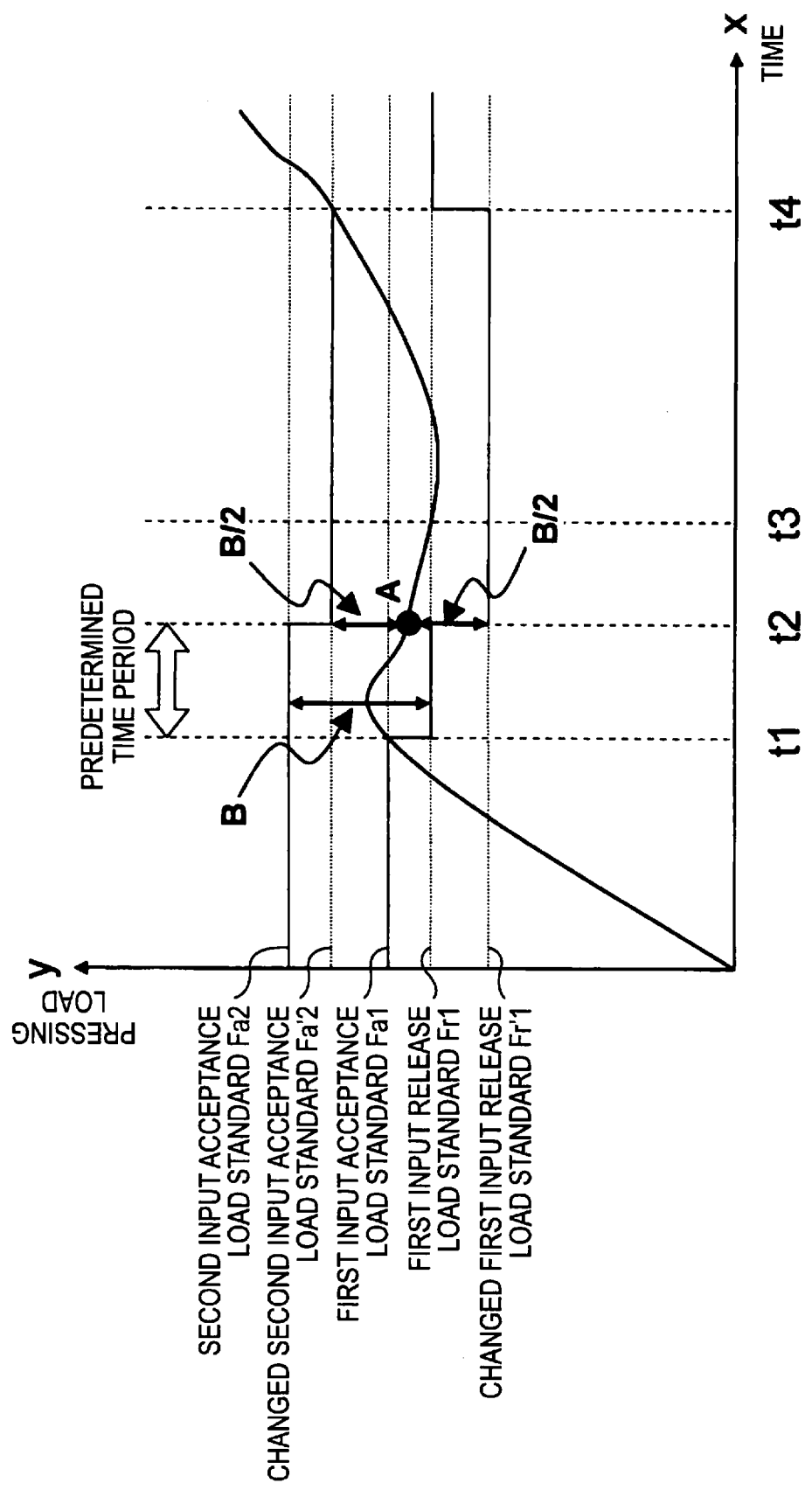
FIG. 4 is a graph illustrating about changing of a pressing load detected by a load detecting unit of an electronic device according to a second embodiment of the present invention.

FIG. 4 is a graph illustrating about changing of the pressing load detected by the load detecting unit 12. An X-axis direction represents the passage of time, and a Y-axis direction represents the pressing load detected by the load detecting unit 12. In FIG. 4, the time point at which the user touches the touch face 11a of the touch sensor 11 is the original point, and the pressing load at that time is 0.

In the second embodiment, after the first-level input is accepted, when the load detecting unit 12 detects a pressing load, which satisfies the first input release load standard Fr1 and does not satisfy the second input acceptance load standard Fa2, for the predetermined time period, the control unit 16 newly sets the first input release load standard (changed first input release load standard) Fr'1 (Fr'1=A−B/2), and newly sets the second input acceptance load standard (changed second input acceptance load standard) Fa'2 (Fa'2=A+B/2), from the pressing load 'A' detected at the time point t2, and the interval from the first input release load standard Fr1 to the second input acceptance load standard Fa2. As described above, when the first input release load standard and the second input acceptance load standard are newly set on the basis of the pressing load detected at the time point t2 by the load detecting unit 12, even when the load detecting unit 12 detects a pressing load reaching the unchanged first input release load standard Fr1 at the time point t3, the acceptance of the first-level input is not released.

After the AE and/or AF process is completed, the user can consciously increase the pressing force so that the load detecting unit 12 detects a pressing load satisfying the changed second input acceptance load standard Fa'2 (at a time point t4), whereby the shutter is clicked.

As described above, according to the present embodiment, when the load detecting unit 12 detects a pressing load, which satisfies the first input release load standard Fr1 and does not satisfy the second input acceptance load standard Fa2, for the predetermined time period, the control unit 16 newly sets the first input release load standard (changed first input release load standard) Fr'1 (Fr'1=A−B/2), and newly sets the second input acceptance load standard (changed second input acceptance load standard) Fa'2 (Fa'2=A+B/2). Therefore, since at least one load standard of the first input release load standard Fr1 and the second input acceptance load standard Fa2 is newly set so that an interval from the corresponding load standard to the pressing load detected by the load detecting unit 12 widens, it is possible to reduce a risk that, when it is desired to maintain the acceptance of the first-level input, due to a change in the pressing force unintended by the user, the acceptance of the first-level input will be unintentionally released, or the second-level input will be newly accepted.

Further, in the present embodiment, in step S206, both of the first input release load standard Fr1 and the second input acceptance load standard Fa2 are changed so that the first input release load standard Fr'1 and the second input acceptance load standard Fa'2 are set as new load standards. However, the present invention is not limited thereto. Only one load standard of the first input release load standard Fr1 and the second input acceptance load standard Fa2 may be changed, so that either the changed first input release load standard Fr'1 and the second input acceptance load standard Fa2 or the first input release load standard Fr1 and the changed second input acceptance load standard Fa'2 are set as the new load standards. At this time, the control unit 16 may control so that an interval from a pressing load 'A' detected at the time point t2 by the load detecting unit 12 to the changed changed first input release load standard Fr'1 is wider than the interval from the pressing load 'A' to the first input release load standard Fr1, or an interval from the pressing load 'A' to the changed second input acceptance load standard Fa'2 is wider than an interval from the pressing load 'A' to the second input acceptance load standard Fa2.

Moreover, in the present embodiment, the changed first input release load standard Fr'1 and the changed second input acceptance load standard Fa'2 are set to the load standards which become (Fr'1=A−B/2) and (Fr'2=A+B/2), respectively. However, the present invention is not limited thereto. The control unit 16 may control so that the interval from the pressing load 'A' detected at the time point t2 by the load detecting unit 12 to the changed first input release load standard Fr'1 is wider than the interval from the pressing load 'A' to the first input release load standard Fr1, or the interval from the pressing load 'A' to the changed second input acceptance load standard Fa'2 is wider than the interval from the pressing load 'A' to the second input acceptance load standard Fa2.

Third Embodiment

Next, an electronic device according to a third embodiment of the present invention will be described. The third embodiment of the present invention is changed in the determination contents in step S105 described in the above-mentioned first embodiment with reference to FIG. 2. The electronic device according to the third embodiment can be implemented by the same configuration as that of the electronic device described in the first embodiment, and is different from the electronic device of the first embodiment in the process and operation of the control unit 16. Therefore, the same explanation as that in the above-mentioned first embodiment, and a description of the same effects as those of the first embodiment will be appropriately omitted.

Figure 5:
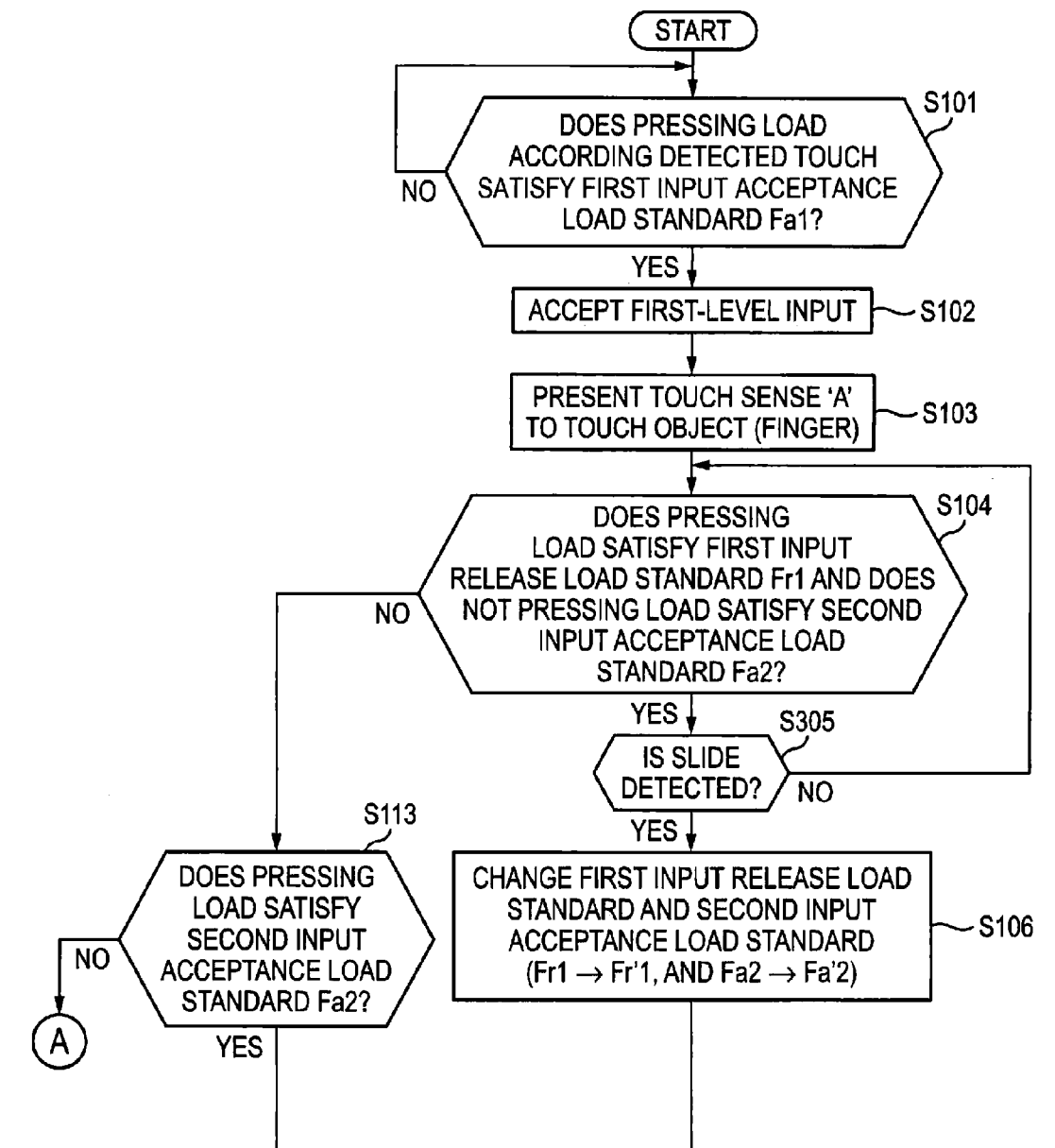
FIG. 5 is a flow chart illustrating an input process of an electronic device according to a third embodiment of the present invention.

With respect to the third embodiment, an input process will be described with reference to the flow chart of FIG. 5. Also, in the flow chart of FIG. 5, steps of performing the same processes as those of FIG. 2 are denoted by the same numerals as those of FIG. 2.

In the third embodiment, in case that it is determined in step S104 that the load detecting unit 12 detects a pressing load that satisfies the first input release load standard Fr1 and does not satisfy the second input acceptance load standard Fa2, the control unit 16 performs the following process in step S305. In step S305, the control unit 16 determines whether the touch object, such as a finger, being in touch with the touch face 11a of the touch sensor 11 is sliding on the touch face 11a. In case that it is determined that the touch object such as a finger is sliding on the touch face 11a, the control unit 16 proceeds to step S106, and in case that it is determined that it is not slid, the control unit 16 returns to step S104.

Figure 6:
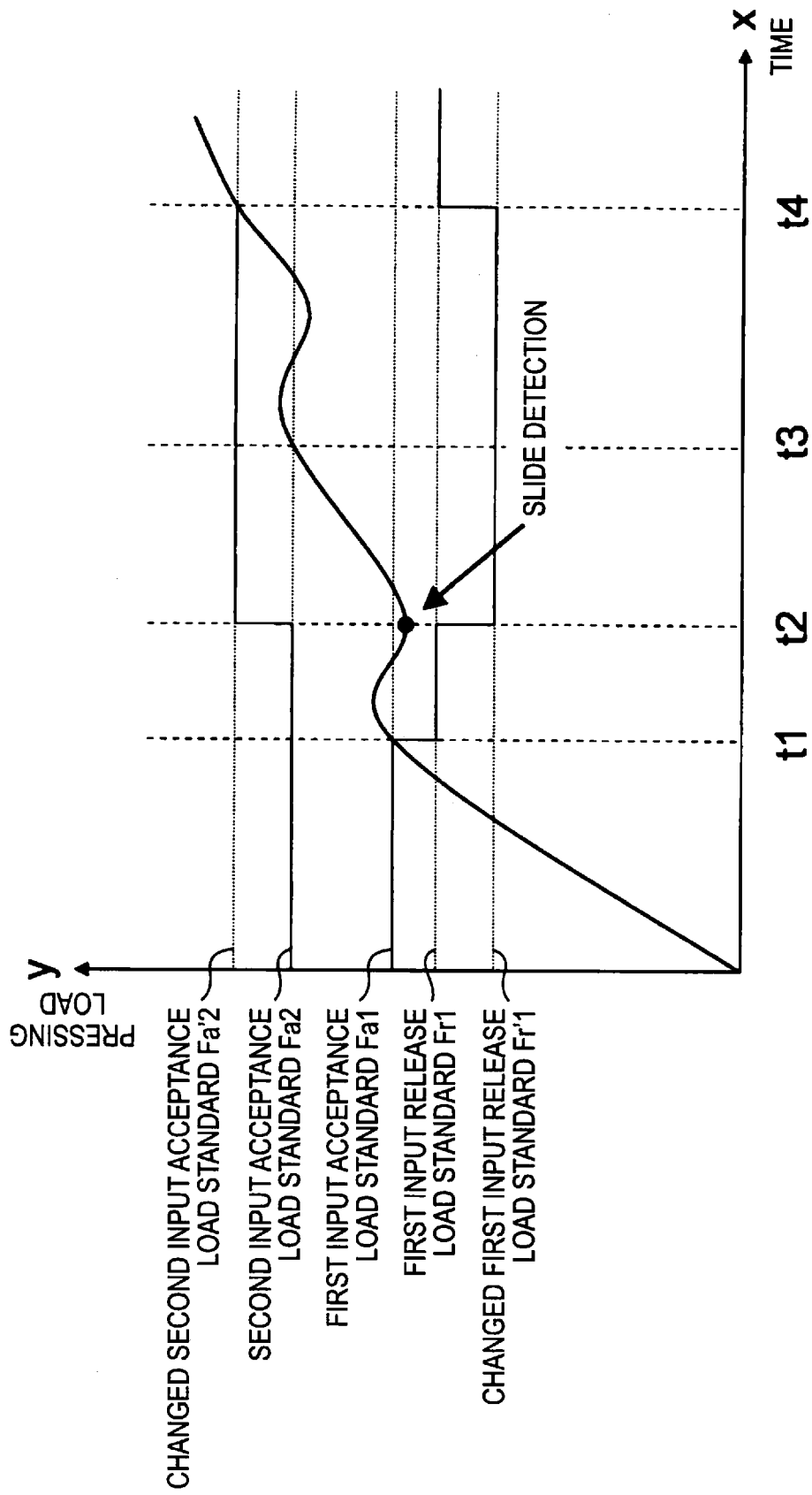
FIG. 6 is a graph illustrating about changing of a pressing load detected by a load detecting unit of the electronic device according to the third embodiment of the present invention.

FIG. 6 is a graph illustrating about changing of the pressing load detected by the load detecting unit 12. An X-axis direction represents the passage of time, and a Y-axis direction represents the pressing load detected by the load detecting unit 12. In FIG. 6, the time point at which the user touches the touch face 11a of the touch sensor 11 is the original point, and the pressing load at that time is 0.

In the third embodiment, after the first-level input is accepted, when the load detecting unit 12 detects a pressing load that satisfies the first input release load standard Fr1 and does not satisfy the second input acceptance load standard Fa2, when slide is detected (the time point t2), the control unit 16 newly sets a load standard lower than the first input release load standard Fr1, as the first input release load standard (changed first input release load standard) Fr'1, and also newly sets a load standard higher than the second input acceptance load standard, as the second input acceptance load standard (changed second input acceptance load standard) Fa'2.

As described above, when the load standards are changed, even when the load detecting unit 12 detects a pressing load reaching the unchanged second input acceptance load standard Fa2 at the time point t3, a new input is not accepted as the second-level input.

As described above, according to the present embodiment, when the load detecting unit 12 detects a pressing load that satisfies the first input release load standard Fr1 and does not satisfy the second input acceptance load standard Fa2, when slide is detected at the time point t2, the control unit 16 newly sets a load standard lower than the first input release load standard Fr1, as the first input release load standard Fr'1, and also newly sets a load standard higher than the second input acceptance load standard Fa2, as the second input acceptance load standard Fa'2.

This configuration is effective, for example, in a case where the following processes are performed as the processes defined in the electronic device. Those processes will be listed below.

When the first-level input to an input object displayed on the display unit 14 is accepted, the electronic device performs a process of selecting the input object. When the touch object such as a finger slides on the touch face 11a during the selecting process, the electronic device performs a process of dragging the input object. Further, when the acceptance of the first-level input is released during the process of selecting or dragging the input object, the electronic device performs a process of dropping the input object. Furthermore, when the second-level input to the input object is accepted, the electronic device performs an execution process corresponding to the input object.

In the electronic device performing the above-mentioned processes, during the process of dragging the input object, when the user cannot appropriately adjust the pressing force so that the pressing load detected by the load detecting unit 12 does not satisfy the first input release load standard Fr1 against user's will, the input object in the dragging process may be dropped at an unintended position. Also, similarly, during the process of dragging the input object, when the user cannot appropriately adjust the pressing force so that the pressing load detected by the load detecting unit 12 satisfies the second input acceptance load standard Fa2 against user's will, the execution process corresponding to the input object may be unintentionally performed. Specifically, in a case where the user is performing slide manipulation on the touch face 11a, since it is difficult to adjust the pressing force, a risk that the above-mentioned unintended process will be performed increases.

According to the third embodiment, when the load detecting unit 12 detects a pressing load that satisfies the first input release load standard Fr1 and does not satisfy the second input acceptance load standard Fa2, when slide is detected, the control unit 16 newly sets a load standard lower than the first input release load standard Fr1, as the first input release load standard Fr'1, and also newly sets a load standard higher than the second input acceptance load standard, as the second input acceptance load standard Fa'2. Therefore, it is possible to reduce a risk that, during a dragging process based on slide manipulation of the user, the input object will be unintentionally dropped or the execution process corresponding to the input object will be unintentionally performed.

Further, in the present embodiment, in step S106, both of the first input release load standard Fr1 and the second input acceptance load standard Fa2 are changed so that the first input release load standard Fr'1 and the second input acceptance load standard Fa'2 are set as new load standards. However, the present invention is not limited thereto. Only one load standard of the first input release load standard Fr1 and the second input acceptance load standard Fa2 may be changed, so that either the changed first input release load standard Fr'1 and the second input acceptance load standard Fa2 or the first input release load standard Fr1 and the changed second input acceptance load standard Fa'2 are set as the new load standards. At this time, the control unit 16 may control so that the interval from the changed first input release load standard Fr'1 to the second input acceptance load standard Fa2 or the interval from the first input release load standard Fr1 to the changed second input acceptance load standard Fa'2 is wider than the interval from the first input release load standard Fr1 to the second input acceptance load standard Fa2.

Fourth Embodiment

Next, an electronic device according to a fourth embodiment of the present invention will be described. The fourth embodiment of the present invention is changed in the method of setting the new load standards in step S106 of FIG. 5 described in the above-mentioned third embodiment. The electronic device according to the fourth embodiment can be implemented by the same configuration as that of the electronic device described in the first embodiment, and is different from the electronic device according to the first embodiment in the process and operation of the control unit 16. Therefore, the same explanation as that in the above-mentioned third embodiment, and a description of the same effects as those of the third embodiment will be appropriately omitted.

Similarly to the third embodiment, with respect to the fourth embodiment, an input process will be described with reference to the flow chart of FIG. 5. In the fourth embodiment, in case that it is determined in step S305 that the load detecting unit 12 detects a pressing load that satisfies the first input release load standard Fr1 and does not satisfy the second input acceptance load standard Fa2, and determining in step S305 that the touch object, such as a finger, being in touch with the touch face 11a of the touch sensor 11 is sliding on the touch face 11a, the control unit 16 performs the following process, instead of the process of step S106. This process is referred to a process of step S406. In step S406, the control unit 16 newly sets the load standards on the basis of the pressing load detected by the load detecting unit 12 at the time point at which the slide was detected in step S305. When the pressing load detected in step S305 by the load detecting unit 12 at the time point at which the slide was detected is 'A' and the interval from the first input release load standard Fr1 to the second input acceptance load standard Fa2 is 'B', in step S406, the changed first input release load standard Fr'1 is set to a load standard expressed by Fr'1=A−B/2, and the changed second input acceptance load standard Fa'2 is set to a load standard expressed by Fa'2=A+B/2.

Figure 7:
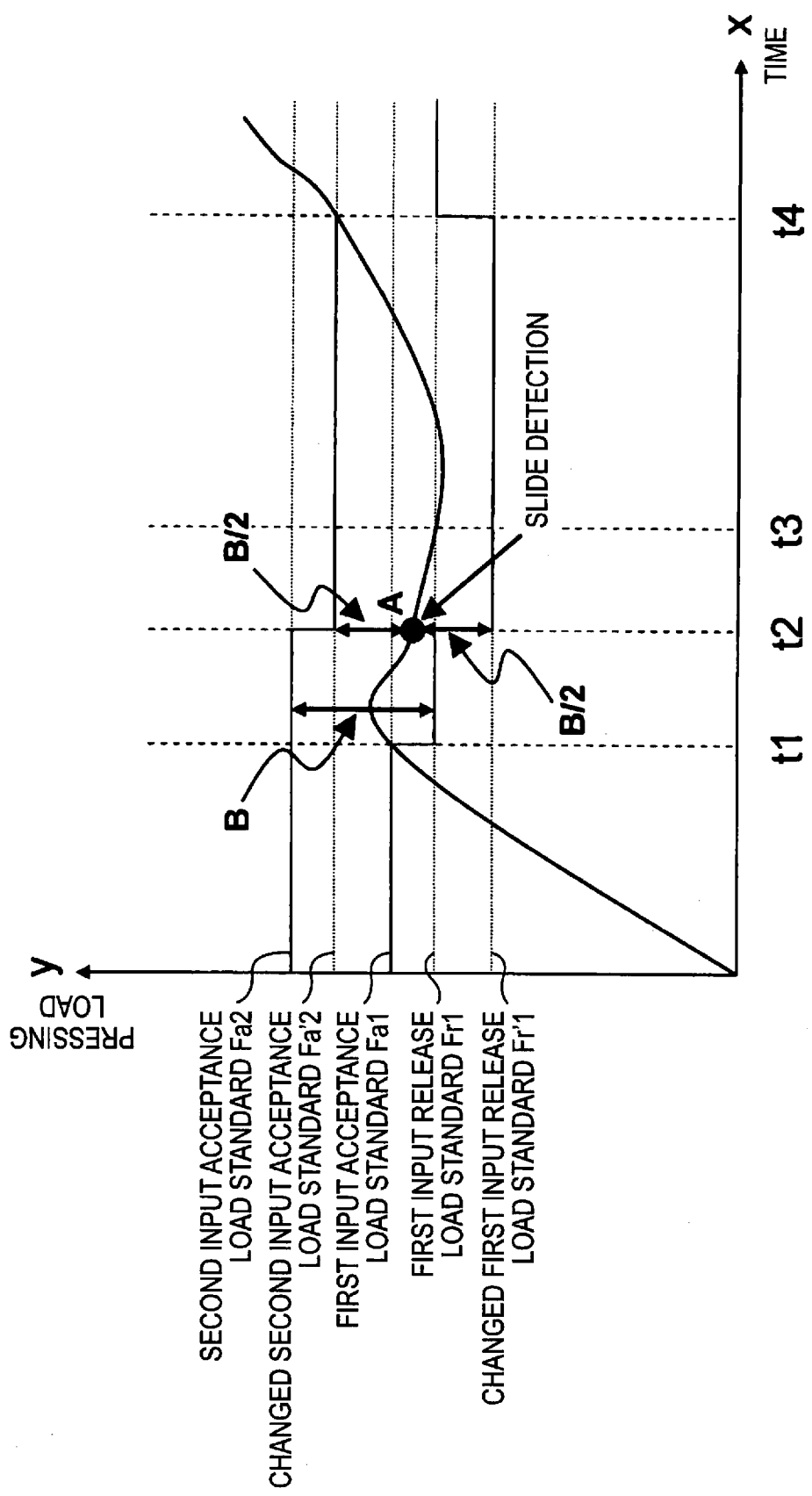
FIG. 7 is a graph illustrating about changing of a pressing load detected by a load detecting unit of an electronic device according to a fourth embodiment of the present invention.
Figure 8:
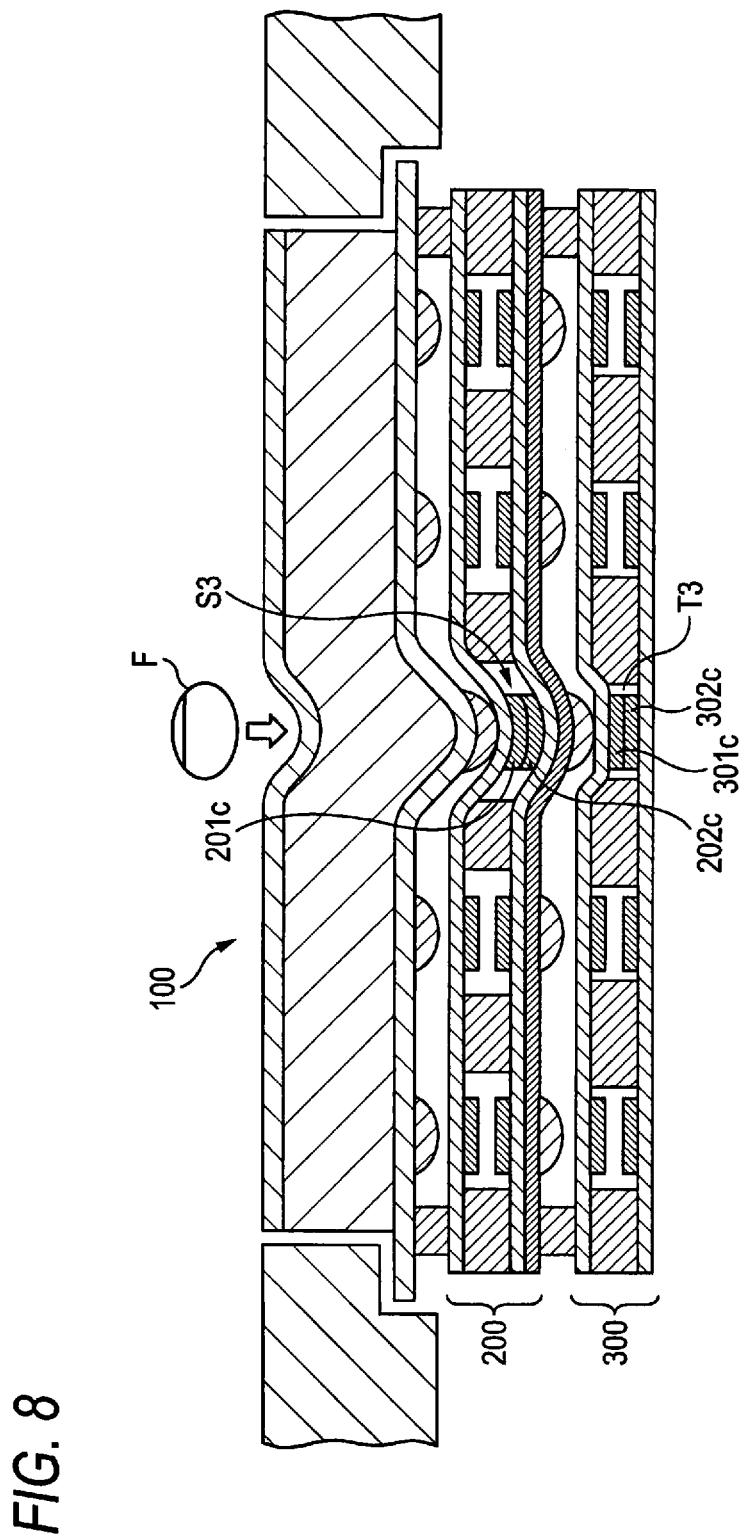
FIG. 8 is a cross-sectional schematic view illustrating an internal configuration of a manipulation device according to the related art.

FIG. 7 is a graph illustrating about changing of the pressing load detected by the load detecting unit 12. An X-axis direction represents the passage of time, and a Y-axis direction represents the pressing load detected by the load detecting unit 12. In FIG. 7, the time point at which the user touches the touch face 11a of the touch sensor 11 is the original point, and the pressing load at that time is 0.

In the fourth embodiment, after the first-level input is accepted, when the load detecting unit 12 detects a pressing load that satisfies the first input release load standard Fr1 and does not satisfy the second input acceptance load standard Fa2, if slide is detected, the control unit 16 newly sets the first input release load standard (changed first input release load standard) Fr'1 (Fr'1=A−B/2), and also newly sets the second input acceptance load standard (changed second input acceptance load standard) Fa'2 (Fa'2=A+B/2), from the pressing load 'A' detected at the time point (time point t2) when the slide was detected, and the interval 'B' from the first input release load standard Fr1 to the second input acceptance load standard Fa2. As described above, when the first input release load standard and the second input acceptance load standard are newly set on the basis of the pressing load detected at the time point t2 by the load detecting unit 12, even when the load detecting unit 12 detects a pressing load reaching the unchanged first input release load standard Fr1 at the time point t3, the acceptance of the first-level input is not released.

According to this configuration, for example, in the electronic device which performs the processes supposed in the third embodiment, it is possible to reduce a risk that releasing of input acceptance unintended by the user or an unintended process according to accepting of a new input will be performed.

Further, in the present embodiment, in step S406, both of the first input release load standard Fr1 and the second input acceptance load standard Fa2 are changed so that the first input release load standard Fr'1 and the second input acceptance load standard Fa'2 are set as new load standards. However, the present invention is not limited thereto. Only one load standard of the first input release load standard Fr1 and the second input acceptance load standard Fa2 may be changed, so that either the changed first input release load standard Fr'1 and the second input acceptance load standard Fa2 or the first input release load standard Fr1 and the changed second input acceptance load standard Fa'2 are set as the new load standards. At this time, the control unit 16 may control so that the interval from the pressing load 'A' detected at the time point t2 by the load detecting unit 12 to the changed first input release load standard Fr'1 is wider than the interval from the pressing load 'A' to the first input release load standard Fr1, or the interval from the pressing load 'A' to the changed second input acceptance load standard Fa'2 is wider than the interval from the pressing load 'A' to the second input acceptance load standard Fa2.

Moreover, in the present embodiment, the changed first input release load standard Fr'1 and the changed second input acceptance load standard Fa'2 are set to the load standards which become (Fr'1=A−B/2) and (Fr'2=A+B/2), respectively. However, the present invention is not limited thereto. The control unit 16 may control so that the interval from the pressing load 'A' detected at the time point t2 by the load detecting unit 12 to the changed first input release load standard Fr'1 is wider than the interval from the pressing load 'A' to the first input release load standard Fr1, or the interval from the pressing load 'A' to the changed second input acceptance load standard Fa'2 is wider than the interval from the pressing load 'A' to the second input acceptance load standard Fa2.

Although the present invention has been described based on all of the drawings and the embodiments, it is noted that it is easy for those skilled in the art to make various changes and modifications based on the present disclosure. Therefore, it is noted that those changes and modifications are included in the scope of the present invention.

In the present embodiment, a load standard for accepting an input and a load standard for releasing the input are set to different standards. However, the present invention is not limited thereto. A load standard for accepting an input and a load standard for releasing the input are may be set to the same standard. In other words, the control unit 16 may control so that, when a pressing load detected by the load detecting unit 12 satisfies an input load standard, an input is accepted, and when the pressing load detected by the load detecting unit 12 does not satisfy the input load standard, the acceptance of the corresponding input is released.

Further, in the present embodiment, the electronic device having the touch sensor has been described. However, the present invention is not limited to electronic device having touch sensors. The present invention may be applied to electronic devices having mechanical switches.

Furthermore, the display unit 14 and the touch sensor 11 in the description of the present embodiment may be configured by an integrated device obtained by giving the functions of both of them to a common board. As an example of the configuration of that device obtained by integrating the functions of both of the display unit 14 and the touch sensor 11, there is a device in which a plurality of photoelectric conversion elements such as photodiodes are regularly mixed in a group of pixel electrodes arranged in matrix in a liquid crystal panel. This device display an image according to the liquid crystal panel structure, and also detect a touch position by receiving reflected light of light of a backlight for liquid crystal display by the fore end of a pen for performing input by touching a desired position of a panel face, by photoelectric conversion elements neighboring the touch position.

Further, when a pressure is applied, a piezoelectric element generates electric power, and when electric power is applied, the piezoelectric element is deformed. Therefore, it is possible to use piezoelectric elements to integrate the load detecting unit 12 and the touch-sense presenting unit 13. Furthermore, since the touch sensor 11 can detect a change in resistance per unit time and a change in capacitance per unit time, the load detecting unit 12 and the touch sensor 11 can be integrated.

The invention claimed is:
1. An electronic device, which accepts inputs in a plurality of levels according to pressing loads, comprising:
    a load detecting unit, which detects a pressing load of an input according to pressing; and
    a control unit, which controls so that, when the load detecting unit detects a pressing load that satisfies a load standard for accepting an input, the input is accepted, and which controls so that, when the load detecting unit detects a pressing load that does not satisfy a load stan- dard for releasing the acceptance of the input after the input is accepted, the accepting state of the input is released, wherein, after a first-level input is accepted, when the load detecting unit continuously detects a pressing load, which satisfies a first load standard for releasing the acceptance of the first-level input and does not satisfy a second load standard for accepting a second-level input higher than the first load standard, for a predetermined time period, the control unit controls at least one load standard of the first load standard and the second load standard so that an interval from the first load standard to the second load standard widens.

2. An electronic device, which accepts inputs in a plurality of levels according to pressing loads, comprising:

a load detecting unit that detects a pressing load of an input according to pressing; and a control unit, which controls so that, when the load detecting unit detects a pressing load that satisfies a load standard for accepting an input, the input is accepted, and which controls so that, when the load detecting unit detects a pressing load that does not satisfy a load standard for releasing the acceptance of the input after the input is accepted, the accepting state of the input is released, wherein, after a first-level input is accepted, when the load detecting unit continuously detects a pressing load, which satisfies a first load standard for releasing the acceptance of the first-level input and does not satisfy a second load standard for accepting a second-level input higher than the first load standard, for a predetermined time period, the control unit controls at least one load standard of the first load standard and the second load standard so that an interval from the corresponding load standard to the pressing load detected by the load detecting unit widens.

3. An electronic device, which accepts inputs in a plurality of levels according to pressing loads, comprising:

a touch sensor, which detects touch;

a load detecting unit, which detects a pressing load on a touch face of the touch sensor; and a control unit, which controls so that, when the load detecting unit detects a pressing load that satisfies a load standard for accepting an input, the input is accepted, and which controls so that, when the load detecting unit detects a pressing load that does not satisfy a load standard for releasing the acceptance of the input after the input is accepted, the accepting state of the input is released, wherein, after a first-level input is accepted, when the load detecting unit detects a pressing load, which satisfies a first load standard for releasing the acceptance of the first-level input and does not satisfy a second load standard for accepting a second-level input higher than the first load standard, if a slide of a touch object being in touch with the touch face is detected, the control unit controls at least one load standard of the first load standard and the second load standard so that an interval from the first load standard to the second load standard widens.

4. An electronic device, which accepts inputs in a plurality of levels according to pressing loads, comprising:

a touch sensor, which detects touch;

a load detecting unit, which detects a pressing load on a touch face of the touch sensor; and a control unit, which controls so that, when the load detecting unit detects a pressing load that satisfies a load standard for accepting an input, the input is accepted, and which controls so that, when the load detecting unit detects a pressing load that does not satisfy a load standard for releasing the acceptance of the input after the input is accepted, the accepting state of the input is released, wherein, after a first-level input is accepted, when the load detecting unit detects a pressing load, which satisfies a first load standard for releasing the acceptance of the first-level input and does not satisfy a second load standard for accepting a second-level input higher than the first load standard, if a slide of a touch object being in touch with the touch face is detected, the control unit controls at least one load standard of the first load standard and the second load standard so that an interval from the corresponding load standard to the pressing load detected by the load detecting unit widens.

* * * * *